(12) United States Patent
Rastegar

(10) Patent No.: US 6,939,618 B2
(45) Date of Patent: Sep. 6, 2005

(54) STRUCTURAL ELEMENTS

(75) Inventor: Jahangir S. Rastegar, Stony Brook, NY (US)

(73) Assignee: OmniTek Research & Development, Inc., Melville, NY (US)

( * ) Notice: Subject to any disclaimer, the term of this patent is extended or adjusted under 35 U.S.C. 154(b) by 0 days.

(21) Appl. No.: 10/446,229

(22) Filed: May 28, 2003

(65) Prior Publication Data

US 2004/0018103 A1 Jan. 29, 2004

Related U.S. Application Data

(62) Division of application No. 09/588,747, filed on Jun. 6, 2000, now Pat. No. 6,575,715, which is a continuation-in-part of application No. 09/176,709, filed on Oct. 21, 1998, now Pat. No. 6,112,410, which is a division of application No. 08/934,402, filed on Sep. 19, 1997, now Pat. No. 6,054,197.

(51) Int. Cl.[7] ................................................ F04B 17/00
(52) U.S. Cl. ...................... 428/543; 417/413.2; 417/480
(58) Field of Search ............................... 428/543, 35.7, 428/188, 218, 321.5; 417/413.1, 413.2, 478, 480

(56) References Cited

U.S. PATENT DOCUMENTS

| | | | | |
|---|---|---|---|---|
| 4,423,829 A | * | 1/1984 | Katz | ............................ 222/95 |
| 4,425,980 A | | 1/1984 | Miles | |
| 4,566,231 A | | 1/1986 | Konesevich | |
| 4,615,157 A | | 10/1986 | Murray | |
| 4,699,243 A | | 10/1987 | Enoki | |
| 4,954,375 A | | 9/1990 | Sattinger et al. | |
| 5,030,490 A | | 7/1991 | Bronowicki et al. | |
| 5,228,156 A | * | 7/1993 | Wang | ............................. 5/677 |
| 5,308,675 A | | 5/1994 | Crane et al. | |
| 5,473,122 A | | 12/1995 | Kodiyalam et al. | |
| 5,474,840 A | | 12/1995 | Landin | |
| 5,827,052 A | | 10/1998 | Wang | |
| 5,876,187 A | | 3/1999 | Forster et al. | |
| 6,054,197 A | * | 4/2000 | Rastegar | ..................... 428/35.7 |
| 6,183,223 B1 | | 2/2001 | Yajima | |
| 6,352,455 B1 | | 3/2002 | Guagliano et al. | |

FOREIGN PATENT DOCUMENTS

JP             09137842 A    *  5/1997

OTHER PUBLICATIONS

Webster's Collegiate Dictionary, 10th Ed., (1993), p. 1054.*

* cited by examiner

Primary Examiner—Sandra M. Nolan-Rayford
(74) Attorney, Agent, or Firm—Scully, Scott, Murphy & Presser

(57) ABSTRACT

Various application are provided for an enclosure having a first wall and two or more second walls surrounding a cavity. The enclosure also has an inlet and outlet each in fluid communication with the cavity. The second walls each have at least a portion shaped such that a force acting on the first wall tending to deflect the element causes an amplified deflection of the second walls into the cavity. Such applications include a pump, a structure comprised of one or more enclosures, structural elements, and apparatus for storing and releasing energy.

30 Claims, 10 Drawing Sheets

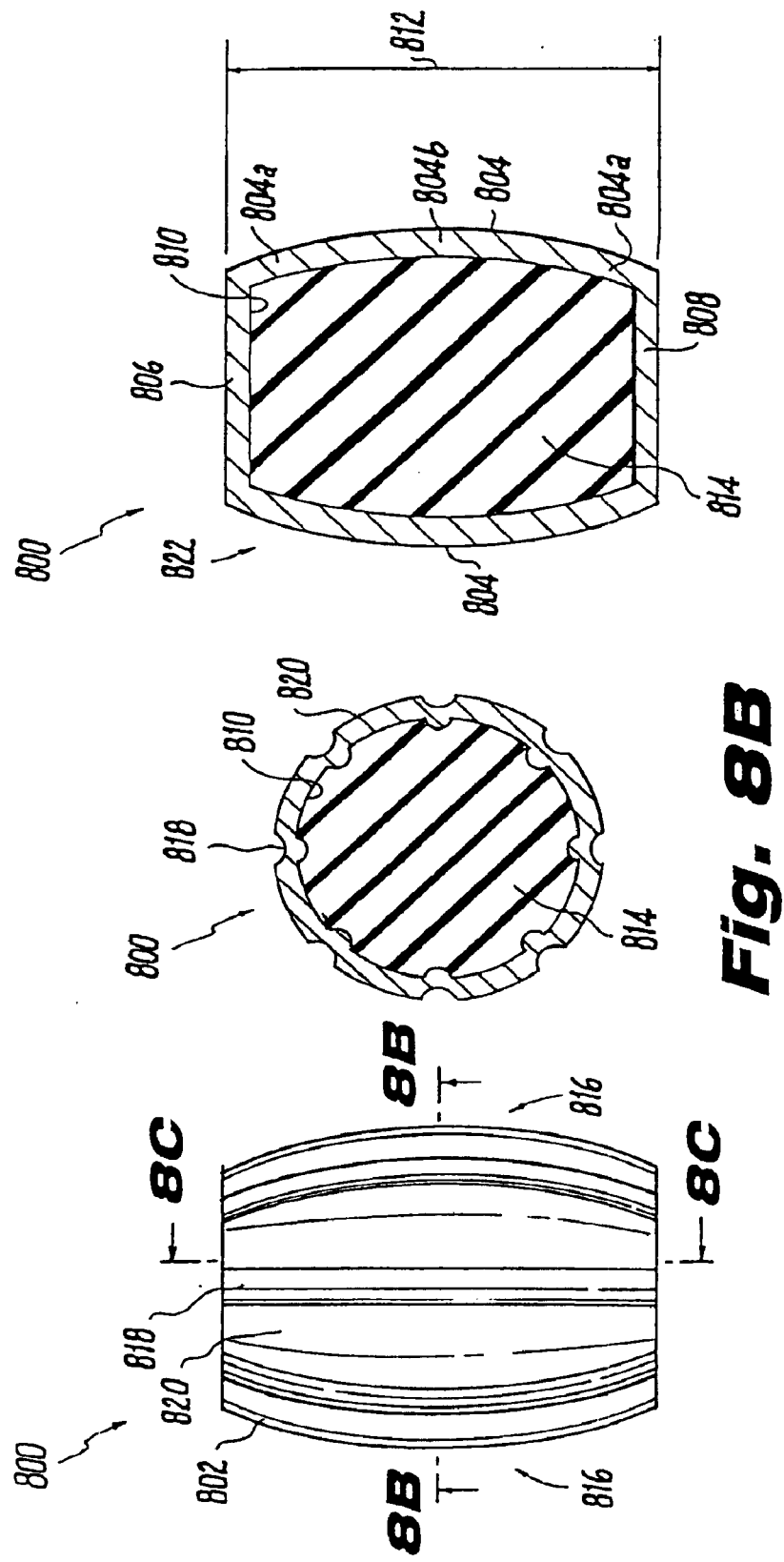

STRUCTURAL ELEMENTS

CROSS-REFERENCE TO RELATED APPLICATIONS

This application is a divisional application of application Ser. No. 09/588,747, filed Jun. 6, 2000, now U.S. Pat. No. 6,575,715; which is a continuation-in-part application of application Ser. No. 09/176,709, filed Oct. 21, 1998, now U.S. Pat. No. 6,112,410; which is a divisional application of application Ser. No. 08/934,402, Filed Sep. 19, 1997 now U.S. Pat. No. 6,054,197.

BACKGROUND OF THE INVENTION

1. Field of the Invention

The field of art to which this invention relates is structural elements, and more particularly to applications for light-weight structural elements having a cavity in which a non-compressible material is disposed resulting in a rigid structure and/or one capable of vibration damping.

2. Description of the Related Art

It is highly desirable to build high speed machinery which are very accurate with structural elements that are light weight, have a high degree of stiffness, and have high internal damping characteristics. This is in fact the case for any product that is subjected to internally and/or externally induced vibrational excitation. With such structural elements, one can then design machines, structures, and other similar devices that are very accurate, that are lighter, and that can operate at higher speeds. This leads to a significant increase in performance.

In the prior art, when vibration becomes a factor, designers had the option of either adding various combinations of mass and viscoelastic material to the structure to employ a passive damper or employ some type of active damping device, such as a piezoelectric device. While the prior art passive damping devices have their advantages, they suffer from the disadvantage of greatly increasing the weight of the structure. This results in a reduction in the attainable speed of the machine or device. Active dampers, on the other hand, are usually lighter but greatly increase the cost of the machine as well as the cost of its operation.

For the above reasons, there is a need in the art for a low weight, low cost structural element that is very rigid and has high internal damping.

SUMMARY OF THE INVENTION

Therefore, it is an object of the present invention to provide a light weight structural element.

It is a further object of the present invention to provide a low cost structural element.

It is yet a further object of the present invention to provide a light weight structural element that provides for increased rigidity over comparable weight structural elements.

It is still yet a further object of the present invention to provide a structural element that is light weight and has high internal damping.

Accordingly, a pump is provided. The pump comprises: an enclosure having a first wall and two or more second walls surrounding a cavity, the enclosure further having an inlet and outlet each in fluid communication with the cavity; a first means for restricting a fluid to flow only into the cavity through the inlet; a second means for restricting the fluid to flow only from the cavity through the outlet; wherein the second walls each having at least a portion thereof shaped such that a force acting on the first wall tending to deflect the element causes an amplified deflection of the second walls into the cavity, thereby forcing fluid from the cavity through the outlet and drawing fluid into the cavity through the inlet.

In a first version of the pump, the second walls are outwardly shaped away from the cavity and the force is a tensile force acting on the first wall tending to elongate the enclosure by the deflection.

In a second version of the pump, the second walls are inwardly shaped towards from the cavity and the force is a compressive force acting on the first wall tending to compress the enclosure by the deflection.

In a preferred implementation of either of the first or second versions of the pump, the first means comprises a one-way valve disposed in the inlet and the second means comprises a one-way valve disposed in the outlet. In a yet more preferred implementation, the pump further comprises an input actuator for applying the force to the first wall, wherein the input actuator is a piezoelectric actuator.

Also provided is a structure comprising at least one structural component. The at least one structural component having at least one structural element for resisting deflection of the structure. The structural element having an internal cavity for storage of a fluid which is consumed with time, the ability of the at least one structural element to resist deflection being based upon the amount of fluid contained in the internal cavity.

Preferably, the structural component comprises a plurality of structural elements, at least two of which having an opening connecting their respective internal cavities. More preferably, each of the plurality of structural elements have the opening connecting it to the internal cavity of another structural element such that the plurality of internal cavities operate as a single cavity.

The at least one structural element of the structure preferably comprises: an enclosure having a first wall and two or more second walls surrounding the internal cavity; wherein the second walls each having at least a portion thereof shaped such that a force acting on the first wall tending to deflect the element causes an amplified deflection of the second walls into the cavity, thereby exerting a compressive force against the fluid in the internal cavity, resulting in a resistance to the deflection and the first force tending to deflect the element.

In a first version of the structural element of the structure, the second walls are outwardly shaped away from the internal cavity and the force is a tensile force acting on the first wall tending to elongate the element by the deflection.

In a second version of the structural element of the structure, the second walls are inwardly shaped towards from the internal cavity and the force is a compressive force acting on the first wall tending to compress the element by the deflection.

Yet further provided is a first structural element. The first structural element comprises: an enclosure having a first wall and two or more second walls surrounding a cavity, the enclosure further having an internal wall separating the cavity into first and second portions, the internal wall having an orifice providing communication between fluid disposed in the first and second portions; wherein the second walls each have at least a portion thereof shaped such that a force acting on the first wall tending to deflect the element causes an amplified deflection of the second walls into the cavity, thereby exerting a compressive force against the fluid, resulting in a resistance to the deflection and the force tending to deflect the element.

In a first version of the first structural element, the second walls are outwardly shaped away from the cavity and the force is a tensile force acting on the first wall tending to elongate the element by the deflection.

In a second version of the first structural element, the second walls are inwardly shaped towards the cavity and the force is a compressive force acting on the first wall tending to compress the element by the deflection.

Also provided is a second structural element comprising: an enclosure having a first wall and two or more second walls surrounding a cavity; and a fluid disposed in the cavity; wherein the second walls each having at least a portion thereof shaped such that a force acting on the first wall tending to deflect the element causes an amplified second deflection of the second walls into the fluid, thereby exerting a second compressive force against the non-compressible material, resulting in a resistance to the first deflection and the first compressive force tending to compress the element.

The second structural element further comprises pressuring means for varying the pressure of the fluid in the cavity to thereby vary the resistance to the deflection.

In a first version of the second structural element, the second walls are outwardly shaped away from the cavity and the force is a tensile force acting on the first wall tending to elongate the element by the deflection.

In a second version of the second structural element, the second walls are inwardly shaped towards the cavity and the force is a compressive force acting on the first wall tending to compress the element by the deflection.

In either of the first or second versions of the second structural element, the pressure of fluid in the cavity is increased to thereby increase the resistance to the deflection or alternatively, the pressure of fluid in the cavity is decreased to thereby decrease the resistance to the deflection.

Still yet further provided is method for storing and releasing energy in a structural element where the structural element comprises an enclosure having a first wall and two or more second walls surrounding a cavity, and a fluid disposed in the cavity, wherein the second walls each having at least a portion thereof shaped such that a deflection of the first wall causes an amplified second deflection of the second walls into the fluid. The method comprises the steps of;

deflecting the first wall into a deflected position; locking the structural element in the deflected position; and releasing the structural element from the deflected position.

Where the second walls are inwardly shaped towards the cavity, the deflecting step preferably comprises withdrawing a portion of the fluid from the cavity, the locking step preferably comprises preventing the withdrawn fluid from returning to the cavity, and the releasing step preferably comprises returning the withdrawn fluid to the cavity.

Where the second walls are outwardly shaped away from the cavity, the deflecting step preferably comprises adding fluid to the cavity, the locking step preferably comprises preventing the added fluid from leaving the cavity, and the releasing step preferably comprises withdrawing the added fluid from the cavity.

BRIEF DESCRIPTION OF THE DRAWINGS

These and other features, aspects, and advantages of the apparatus and methods of the present invention will become better understood with regard to the following description, appended claims, and accompanying drawings where:

FIG. 8A illustrates a front view of a fifth embodiment of the present invention;

FIG. 8B illustrates a sectional view of the embodiment of FIG. 8A taken along line 8B—8B;

FIG. 8C illustrates a sectional view of the embodiment of FIG. 8A taken along line 8C—8C;

DETAILED DESCRIPTION OF THE PREFERRED EMBODIMENTS

Figure 1C:
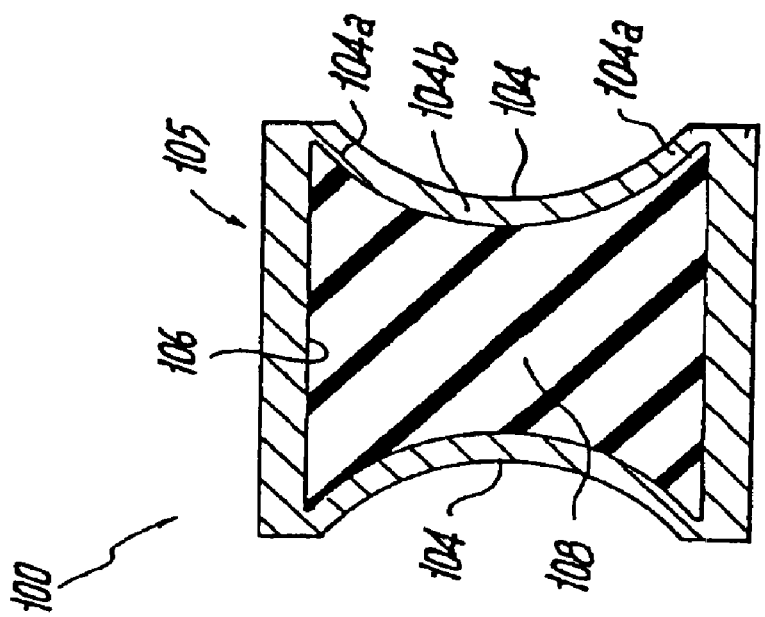
FIG. 1C illustrates a sectional view of the embodiment of FIG. 1B taken along line 1C—1C.
Figure 1B:
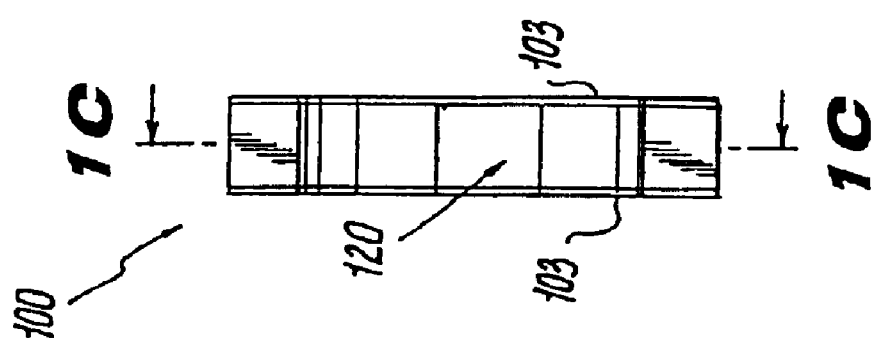
FIG. 1B illustrates a side view of the embodiment of FIG. 1A.
Figure 1A:
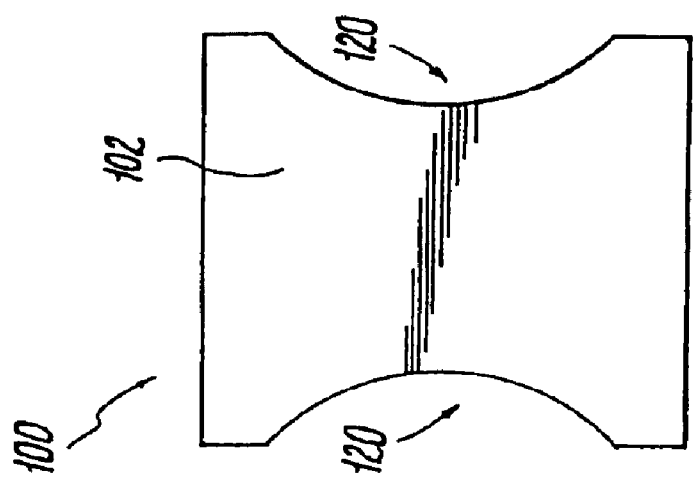
FIG. 1A illustrates a front view of a first embodiment of the present invention.

Referring now to FIGS. 1A, 1B, 1C, and 3A, there is illustrated a first embodiment of the present invention, namely, a compressive structural element referred to generally by reference numeral 100. The compressive structural element 100 has an enclosure 102 having walls 103, 104 and defining a cavity 106. Walls 104 are preferably formed by extruding the structural element's cross-sectional profile 105, as shown in FIG. 1C. Walls 103 are preferably plates, formed by conventional methods, such as stamping, and fastened to the cross-sectional profile by conventional methods, such as welding. However, walls 103 and 104 can be an integral piece forming the enclosure 102.

Disposed in the cavity 106 is a non-compressible material 108. The non-compressible material is preferably an elastomer, a liquid or a combination of elastomer and liquid. The non-compressible material, if an elastomer, is preferably disposed in a length of extrusion having the cross-sectional profile 105 where individual compressive structural elements 100 are sliced from the extrusion as a predetermined thickness.

Figure 3A:
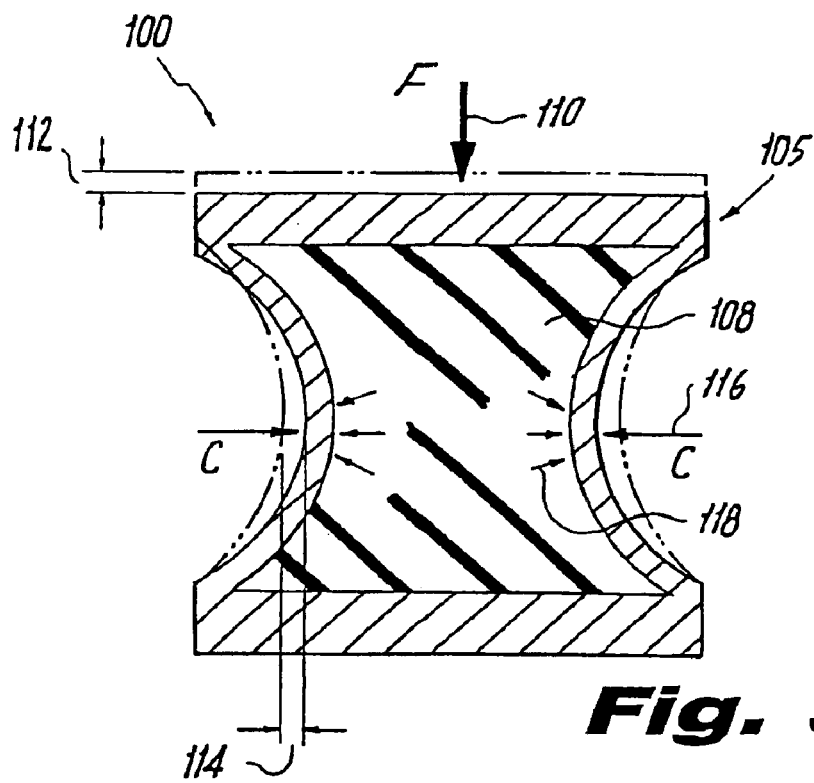
FIG. 3A illustrates the sectional view of FIG. 1C deflecting under a compressive force.

The walls 104 are shaped such that a first compressive force 110, shown in FIG. 3A, tends to compress the structural element 100 by a first deflection 112 which causes an amplified second deflection 114 of the walls 104 into the non-compressible material 108. The relaxed position of the compressive structural element 100 (i.e., where no compressive force 110 is present) is shown in FIG. 3A as dashed lines. The walls 104 thereupon exert a second compressive force 116 against the non-compressible material 108 disposed in the cavity 106. Being non-compressible, the non-compressible material 108, resists the second compressive force with a resistive force 118 resulting in a resistance to the first deflection 112 and the first compressive force 110.

In order to optimize the amplification of the second deflection 114, the walls are preferably concavely shaped 120 into the cavity 106. Furthermore, the walls can be configured to provide optimum damping, optimum rigidity, or a combination of the two depending upon the application. For instance, as shown in FIGS. 1C and 3A, the walls 104 can be of uniform thickness where the end portions 104a are of substantially the same thickness as the center portion 104b. This configuration causes minimal migration of the non-compressible material 108 due to the second compressive force 116 resulting in a compressive structural element 100 which provides for some damping and high rigidity.

Figure 6A:
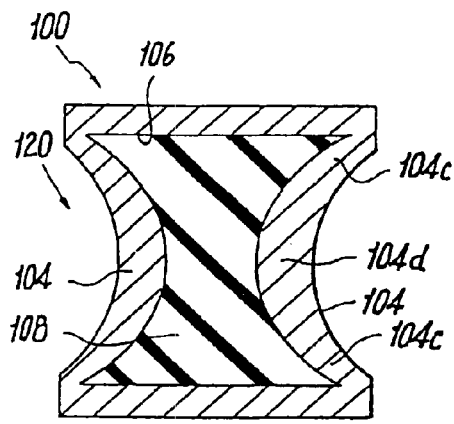
FIGS. 6A, 6B, and 6C illustrate versions of the first three embodiments, respectively, having a non-uniform wall thickness.

Alternatively, as shown in FIG. 6A, the walls 104 can be configured such that the center portion 104d is substantially thicker than at the end portions 104c. This configuration results in increased migration of the non-compressible material 108 due to the second compressive force 116 resulting in a compressive structural element 100 which provides some rigidity and high damping. It is appreciated by someone skilled in the art that the wall configuration can be varied to produce differing degrees of desired damping and rigidity based upon the requirements of the application at hand.

It is also appreciated by someone skilled in the art that different non-compressible materials, or combinations of non-compressible materials will produce differing degrees of desired damping and rigidity based upon the requirements of the application at hand. For instance, a hard elastomer will produce a more rigid structural element 100 with little damping, while a softer elastomer will produce a less rigid structural element 100 with higher damping. Combining an elastomer with a liquid will result in still other possibilities regarding damping and rigidity.

Figure 2C:
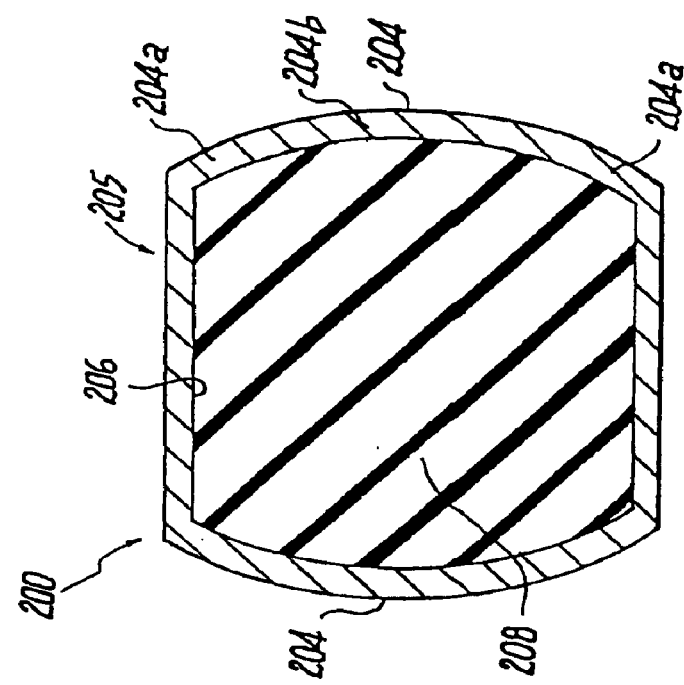
FIG. 2C illustrates a sectional view of the embodiment of FIG. 2B taken along line 2C—2C.
Figure 2B:
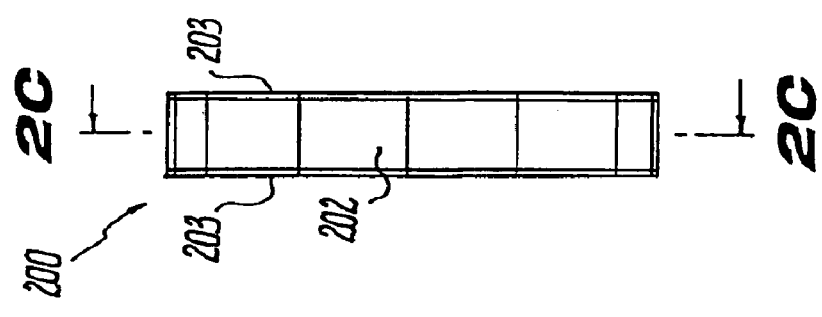
FIG. 2B illustrates a side view of the embodiment of FIG. 2A.
Figure 2A:
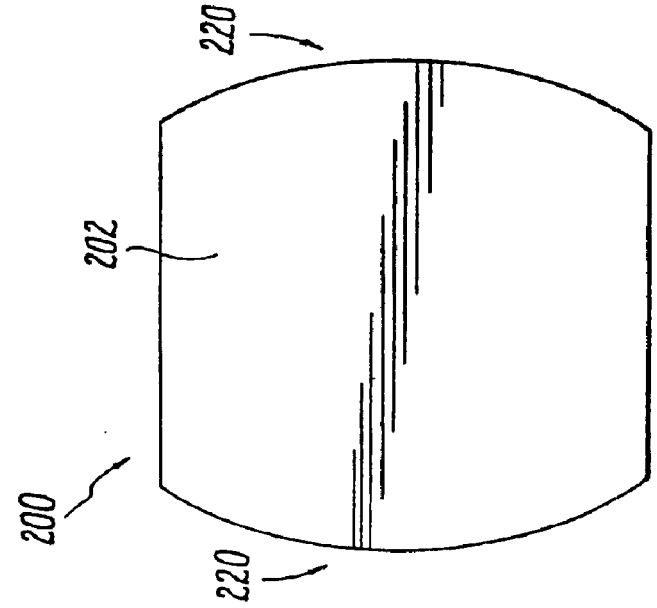
FIG. 2A illustrates a front view of a second embodiment of the present invention.

Referring now to FIGS. 2A, 2B, 2C, and 3B, there is illustrated a second embodiment of the present invention, namely, a tensile structural element referred to generally as reference numeral 200 and being similar to the compressive structural element 100 except for the element's loading and wall configuration to provide damping and rigidity in response to the loading. The tensile structural element 200 has an enclosure 202 having walls 203, 204 and defining a cavity 206. Walls 204 are again preferably formed by extruding the structural element's cross-sectional profile 205, as shown in FIG. 2C. Walls 203 are preferably plates, formed by conventional methods, such as stamping, and fastened to the cross-sectional profile by conventional methods, such as spot welding. However, walls 203, 204 can be an integral piece forming the enclosure 202.

Figure 3B:
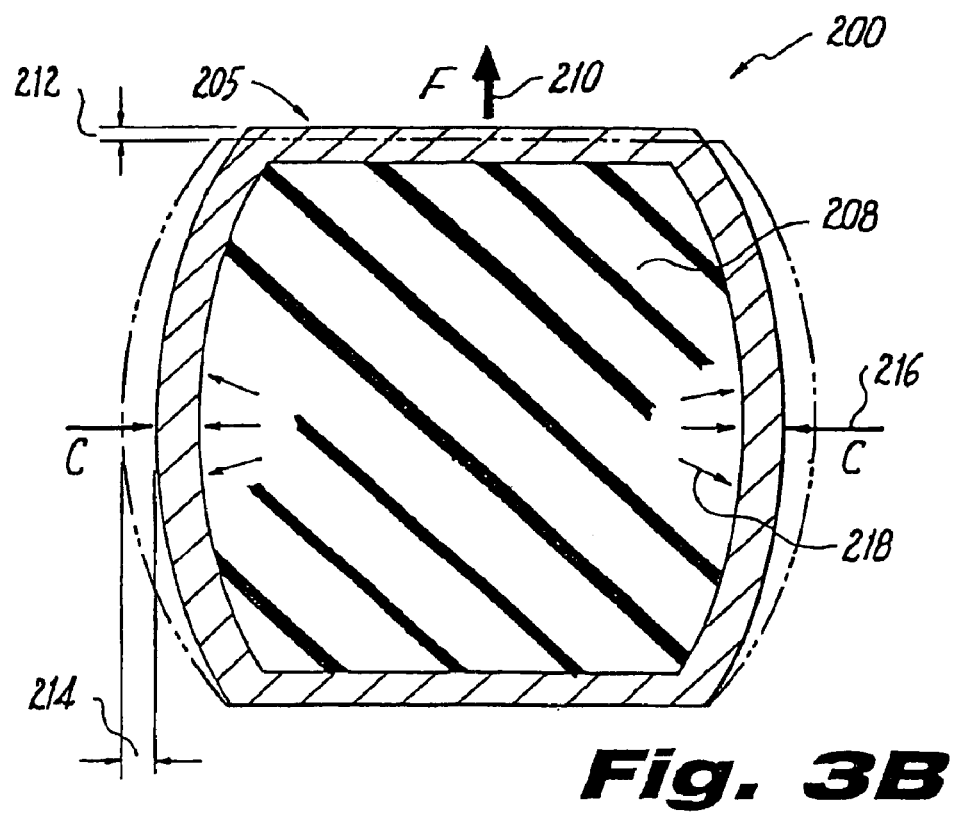
FIG. 3B illustrates the sectional view of FIG. 2C deflecting under a tensile force.

Disposed in the cavity 206 is a non-compressible material 208. As with the compressive structural element 100, the non-compressible material 208 of the tensile compressive element 200 is preferably an elastomer, a liquid or a combination of elastomer and liquid. The walls 204 are shaped such that a tensile force 110, shown in FIG. 3B, tends to elongate the structural element 200 by a first deflection 212 which causes an amplified second deflection 214 of the walls 204 into the non-compressible material 208. The relaxed position of the tensile structural element 200 (i.e., where no tensile force is present) is shown in FIG. 3B as dashed lines. The walls 204 thereupon exert a compressive force 216 against the non-compressible material 208 disposed in the cavity 206. Being non-compressible, the non-compressible material 208, resists the compressive force 216 with a resistive force 218 resulting in a resistance to the first deflection 212 and the tensile force 210.

In order to optimize the amplification of the second deflection 214, the walls are preferably convexly shaped 220 away from the cavity 206. As discussed previously with regard to the compressive structural element 100, the walls 204 can be configured to provide optimum damping, optimum rigidity, or a combination of the two depending upon the application. For instance, as shown in FIGS. 2C and 3B, the walls 204 can be of uniform thickness where the end portions 204a are of substantially the same thickness as the center portion 204b. As discussed previously, this configuration provides for some damping and high rigidity.

Figure 6B:
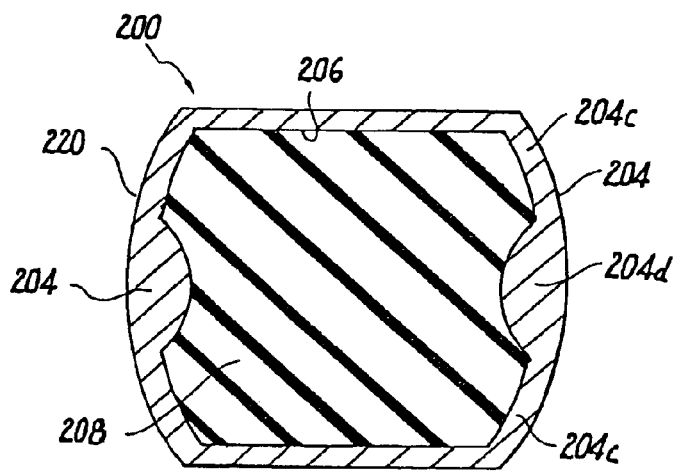

Alternatively, as shown in FIG. 6B, the walls 204 can be configured such that the center portion 204d is substantially thicker than at the end portions 204c. This configuration results in some rigidity and high damping. As discussed above, it is appreciated by someone skilled in the art that the wall configuration can be varied to produce differing degrees of desired damping and rigidity based upon the requirements of the application at hand.

As also discussed above, it is also appreciated by someone skilled in the art that different non-compressible materials, or combinations of non-compressible materials will also produce differing degrees of desired damping and rigidity based upon the requirements of the application at hand.

In a third embodiment of the present invention, shown in FIGS. 4A, 4B, 4C, 5A, and 5B, the structural elements of the first and second embodiments are combined resulting in structural element 400. The structural element 400 has a compressive and a tensile structural element 100, 200, respectively. The compressive structural element 100 has a first enclosure 402 having first walls 403, 404, and 405 and defining a first cavity 406. The tensile structural element 200 has a second enclosure 502 having second walls 403, 504, and 405 and defining a second cavity 506.

Figure 4C:
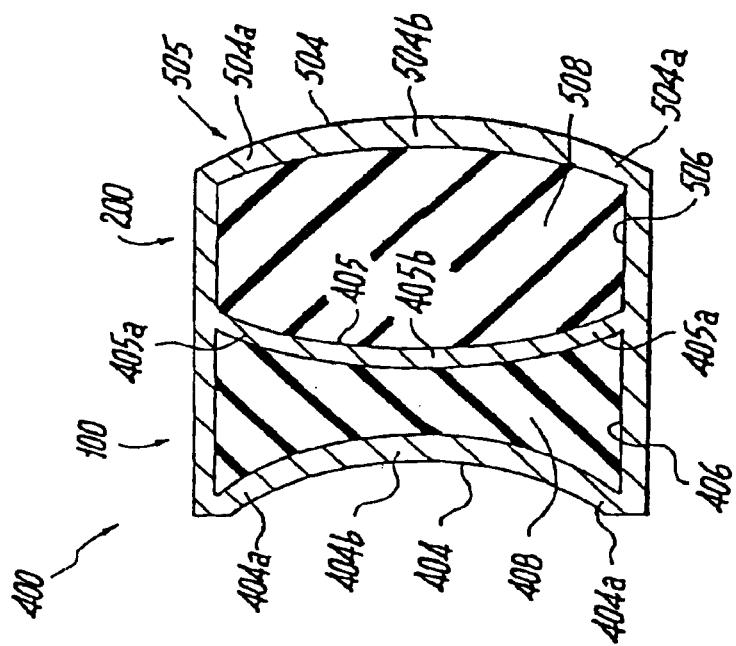
FIG. 4C illustrates a sectional view of the embodiment of FIG. 4B taken along line 4C—4C.
Figure 4B:
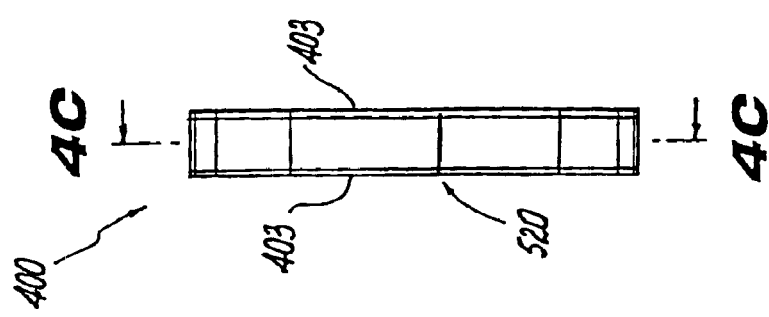
FIG. 4B illustrates a side view of the embodiment of FIG. 4A.
Figure 4A:
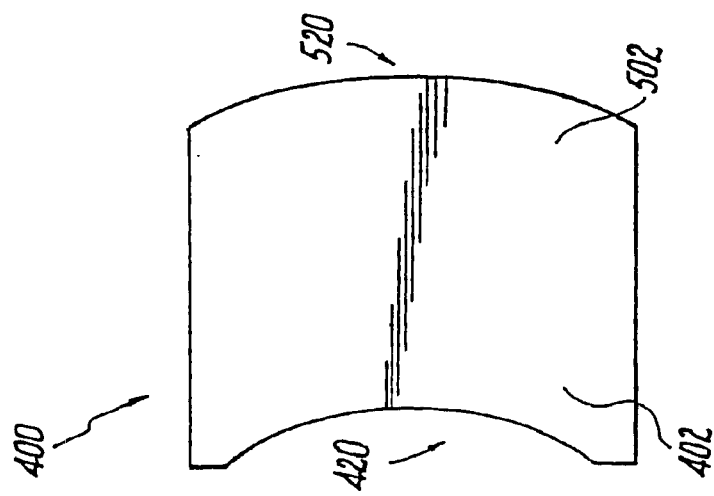
FIG. 4A illustrates a front view of a third embodiment of the present invention.

The first and second walls 404, 504, and 405 are preferably integrally formed by extruding the structural element's cross-sectional profile 505, as shown in FIG. 4C. First and second walls 403 are also preferably integrally formed as plates, by conventional methods, such as stamping, and fastened to the cross-sectional profile by conventional methods, such as welding.

Disposed in the first and second cavities 406, 506 are non-compressible materials 408, 508. The non-compressible materials are preferably an elastomer, a liquid or a combination of elastomer and liquid. The first walls 404, 405 are shaped such that a first force 410, shown in FIG. 5A, tending to compress the structural element 400 by a first deflection 412 causes an amplified second deflection 414 of the first walls 404, 405 into the first non-compressible material 408. The first walls 404, 405 thereupon exert a first compressive force 416 against the first non-compressible material 408 disposed in the first cavity 406. Being non-compressible, the first non-compressible material 408, resists the first compressive force 416 with a resistive force 418 resulting in a resistance to the first deflection 412 and the first force 410.

Figure 5A:
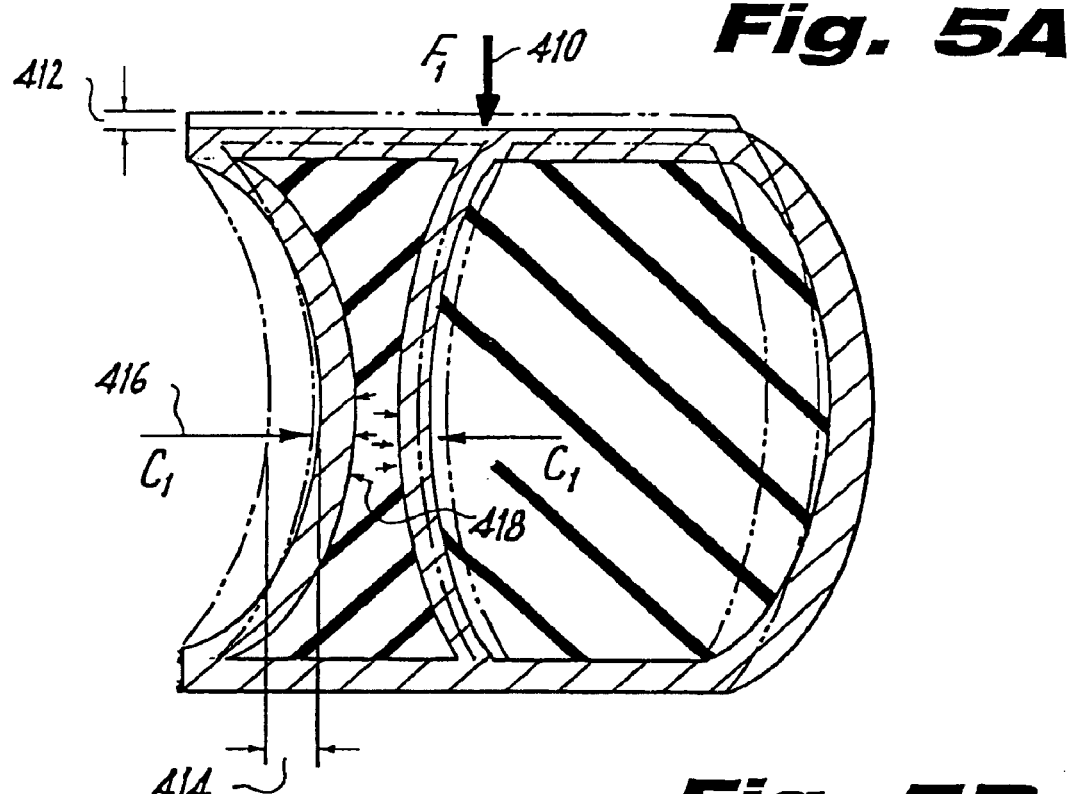
FIG. 5A illustrates the sectional view of FIG. 4C deflecting under a compressive force.
Figure 5B:
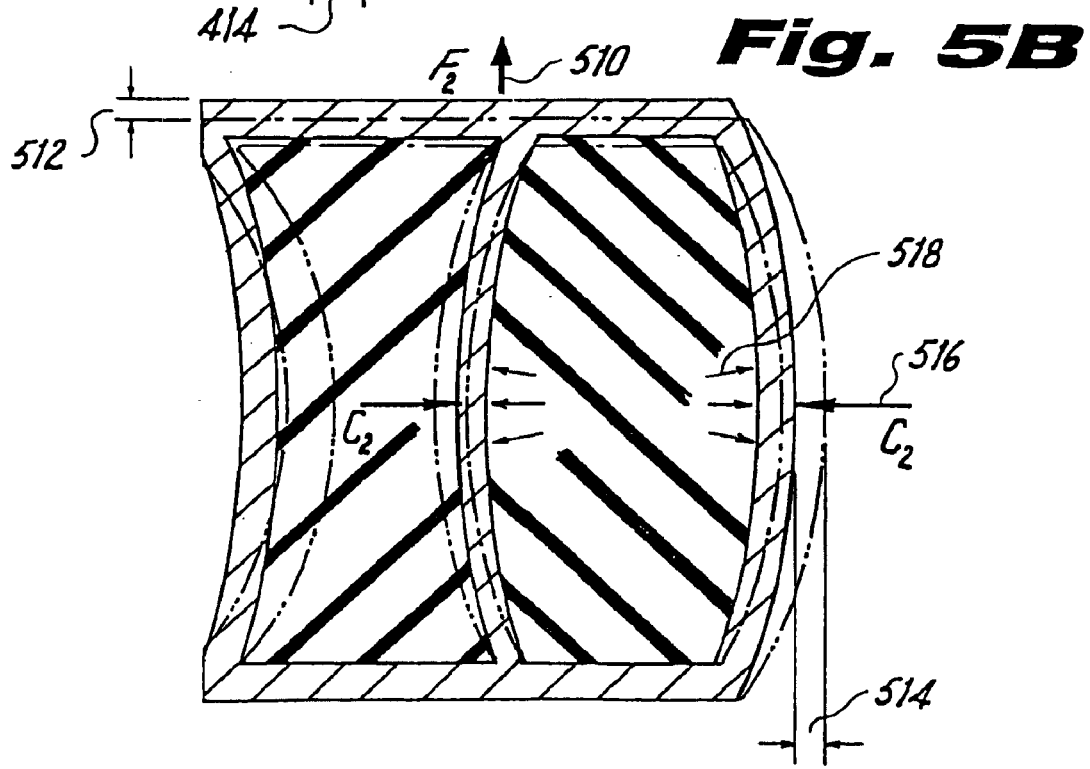
FIG. 5B illustrates the sectional view of FIG. 4C deflecting under a tensile force.

The second walls 504, 405 are shaped such that a second force 510, shown in FIG. 5B, tending to elongate the structural element 400 by a third deflection 512 causes an amplified fourth deflection 514 of the second walls 504, 405 into the second non-compressible material 508. The second walls 504, 405 thereupon exert a second compressive force 516 against the second non-compressible material 508 disposed in the second cavity 506. Being non-compressible, the second non-compressible material 508, resists the second compressive force 516 with a resistive force 518 resulting in a resistance to the third deflection 512 and the second force 510.

Therefore, while in compression due to the first force 410 the structural element 400 acts as does the compressive structural element 100. While in tension due to the second force 510, the structural element 400 acts as does the tensile structural element 200.

In order to optimize the amplification of the second deflection 414, the first walls are preferably concavely shaped 420 into the first cavity 406. Similarly, in order to optimize the amplification of the fourth deflection 514, the second walls are preferably convexly shaped 520 away from the second cavity 506. In the preferred configuration shown in FIG. 4C one of the first walls surrounding the first cavity 406 also comprises one of the second walls surrounding the second cavity 506 resulting in a shared wall 405.

Furthermore, as discussed above with regard to the compressive and tensile structural elements 100, 200 the walls and non-compressible materials can be configured to provide optimum damping, optimum rigidity, or a combination of the two depending upon the application. However, the combined structural element 400 can be configured for differing characteristics for resistance to tensile forces and compressive forces. For instance, the structural element can be configured to provide optimum rigidity and low damping in response to a compressive force, and high damping and low rigidity in response to a tensile force.

Figure 6C:
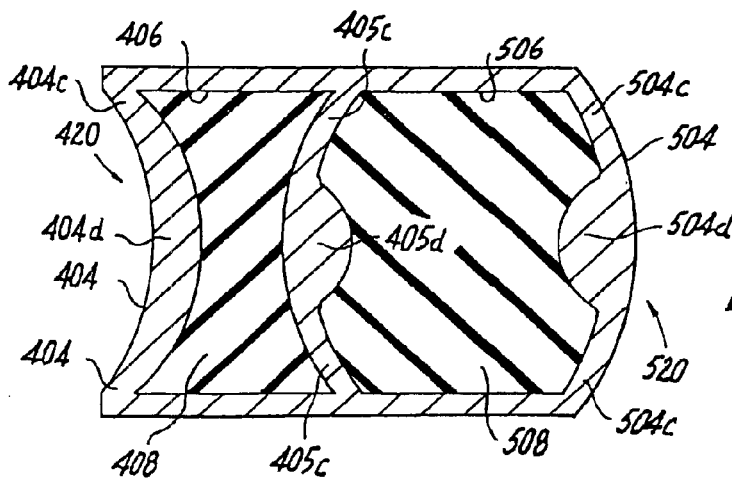

Configuration of the structural element 400 is achieved as discussed above by providing uniform wall thickness 404*a*, 404*b*, 405*a*, 405*b*, 504*a*, 504*b*, as shown in FIG. 4C, by providing varying wall thickness 404*c*, 404*d*, 405*c*, 405*d*, 504*c*, 504*d*, as shown in FIG. 6C, and/or by varying the types of non-compressible materials as well as their characteristics.

Figure 7C:
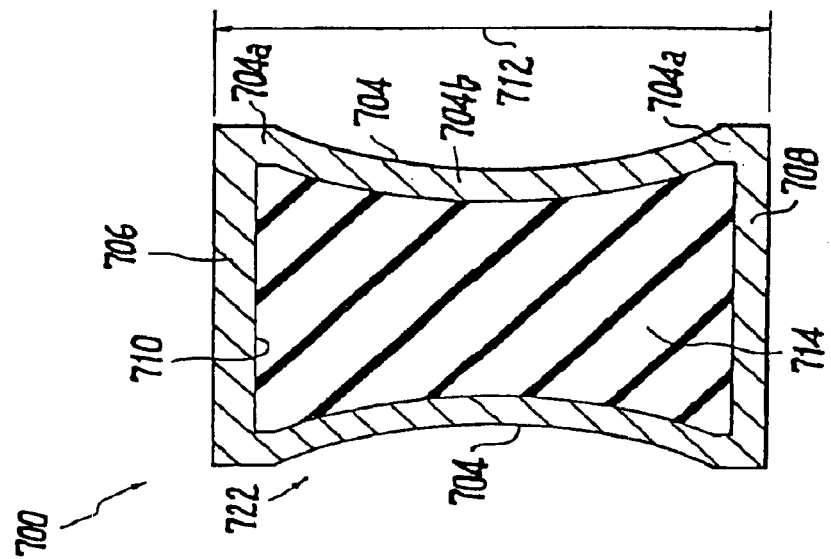
FIG. 7C illustrates a sectional view of the embodiment of FIG. 7A taken along line 7C—7C.
Figure 7B:
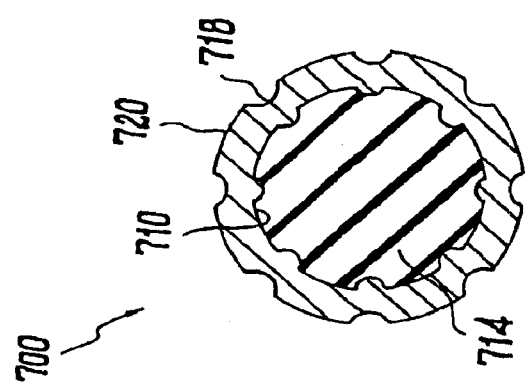
FIG. 7B illustrates a sectional view of the embodiment of FIG. 7A taken along line 7B—7B.
Figure 7A:
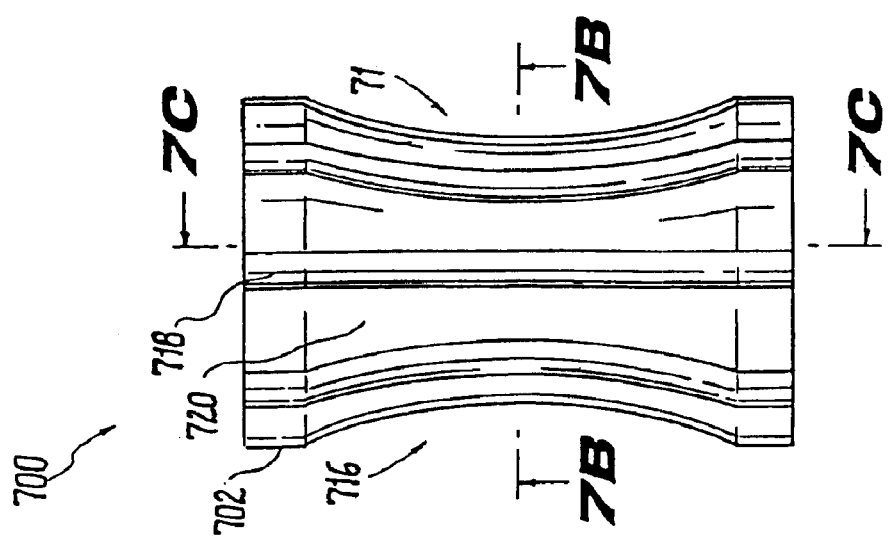
FIG. 7A illustrates a front view of a fourth embodiment of the present invention.

Referring now to FIGS. 7A, 7B, and 7C there is shown a fourth embodiment of the present invention generally referred to as reference numeral 700 which is similar to the compressive structural element 100 except that the compressive structural element 700 is cylindrical in shape. The compressive structural element 700 has a cylindrical enclosure 702 having a wall 704, a top 706, a bottom 708 and a cavity 710 defined by the wall 704, top 706, and bottom 708. The top 706 and bottom 708 of the compressive structural element 700 are separated by a height 712. The compressive structural element 700 also having a non-compressible material 714 disposed in the cavity 710.

The wall 704 preferably comprises a plurality of panels 720 separated by flectural joints 718 for aiding the deflection of the wall 704 into the cavity 710. The flectural joints are preferably "in-turned" portions running longitudinally to the structural elements height. Also, the wall 704, top 706, and bottom 708 preferably comprise an integral metal shell 722. However, it is appreciated by someone skilled in the art that any suitable material can be utilized without departing from the scope and spirit of the invention.

The operation of compressive element 700 in response to a first compressive force will now be explained with reference to FIG. 3A in which the cross-sectional profile shown for compressive structural element 100 is similar to that of compressive structural element 700, the operation of both therefore being the same. The wall 704 of compressive element 700 are concavely shaped 716 such that a first compressive force tending to decrease the height 712 causes an amplified deflection of the wall 704 into the non-compressible material 714. As a result, the wall 704 exerts a second compressive force against the non-compressible material 714, resulting in a resistance to the amplified deflection and the first compressive force.

As discussed previously, the non-compressible material is preferably an elastomer, a liquid, or a combination of elastomer and liquid. Like compressive element 100, compressive element 700 can be configured with a wall 704 for either optimum damping, optimum rigidity or any combination of the two. This is achieved as discussed previously by providing uniform wall thickness 704*a*, 704*b*, varying wall thickness (as similarly shown in FIG. 6A), and by varying the type and characteristics of the non-compressible material 714.

Referring now to FIGS. 8A, 8B, and 8C there is shown a fifth embodiment of the present invention generally referred to as reference numeral 800 which is similar to tensile structural element 200 except that compressive structural element 800 is cylindrical in shape. Compressive structural element 800 has a cylindrical enclosure 802 having a wall 804, a top 806, a bottom 808 and a cavity 810 defined by the wall 804, top 806, and bottom 808. The top 806 and bottom 808 of the compressive structural element 800 being separated by a height 812. The tensile structural element 800 also having a non-compressible material 814 disposed in the cavity 810.

The wall 804 preferably comprises a plurality of panels 820 separated by flectural joints 818 for aiding the deflection of the wall 804 into the cavity 810. The flectural joints are preferably "in-turned" portions running longitudinally to the structural element's height 812. Also, the wall 804, top 806, and bottom 808 preferably comprise an integral metal shell 822. However, it is appreciated by someone skilled in the art that any suitable material can be utilized without departing from the scope and spirit of the invention.

The operation of compressive element 800 in response to a tensile force will now be explained with reference to FIG. 3B in which the cross-sectional profile shown for tensile structural element 200 is similar to that of tensile structural element 800, the operation of both therefore being the same. The wall 804 of compressive element 800 is convexly shaped 816 such that a tensile force tending to increase the height 812 causes an amplified deflection of the wall 804 into the non-compressible material 814. As a result, the wall 804 exerts a compressive force against the non-compressible material 814, resulting in a resistance to the amplified deflection and the tensile force.

As discussed previously, the non-compressible material is preferably an elastomer, a liquid, or a combination of elastomer and liquid. Like tensile element 200, tensile element 800 can be configured with a wall 804 for either optimum damping, optimum rigidity or any combination of the two. This is achieved as discussed previously by providing uniform wall thickness 804*a*, 804*b*, varying wall thickness (as similarly shown in FIG. 6B), and by varying the type and characteristics of the non-compressible material 814.

Embodiments of the present invention which utilize the tensile and compressive structural elements 100, 200, 400, 700, and 800 previously discussed will now be described.

High Throughput Pump

Figure 9:
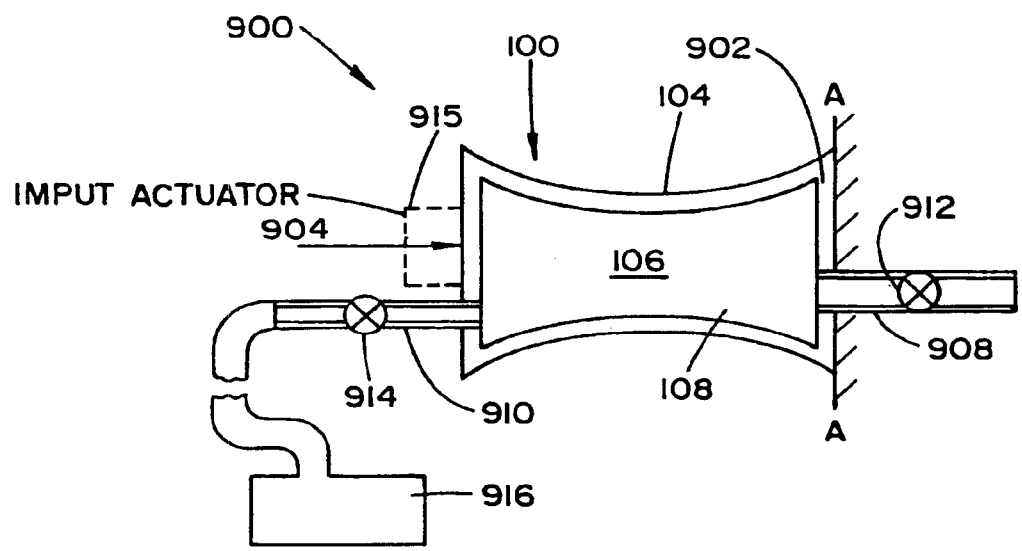
FIG. 9 illustrates a tensile structural element of the present invention used as a pump.

Referring now to FIG. 9, a structural element 100 of the present invention is used as a relatively high throughput pump, the pump being generally referred to by reference numeral 900. A top wall 902 of the structural element 100 is fixed or grounded at A—A, while a force or displacement 904 is input at a bottom wall 906. As discussed above, the side walls 104 will therefore deflect inward into a fluid 108 contained in the cavity 106. A reduction in the volume of the cavity 106 due to the inward deflection of the side walls 104 and the rightward movement of the bottom wall 906 in the direction of the force 904 forces the fluid 108 out of an output port 908. The structural element 100 is also provided with an inlet port 910, through which fluid is supplied to or retrieved from the structural element 100. One-way valves 912 and 914 allow the fluid to flow only in the desired direction. When the pump 900 is to be used to pump fluid out of a reservoir 916 and output it through the outlet port 908, the one way valve 914 must allow flow into the cavity 106 of the structural element 100 and prevent flow out of the structural element 100. Similarly, the one way valve 912 must allow flow out of the cavity 106 of the structural element 100 and prevent flow into the structural element 100. When the pump 900 is to be used to pump fluid into the reservoir 916 from some outside source (not shown), the role of the two one way valves 912, 914 is reversed.

Those skilled in the art will appreciate that for a given input displacement of the bottom wall 906, the side walls 104 are deflected inwards into the fluid an amplified amount, as discussed above. Therefore, the pump 900 produces relatively large output flow for a relatively small input displacement. Therefore, the pump 900 of the present invention is particularly well suited for applications in which the input actuator 915 (shown in dotted lines), e.g., a piezoelectric ceramic actuator, can only provide a very small displacement with high levels of force.

In FIG. 9, a compressive structural element 100 is used to construct the disclosed pump. However, a tensile structural element 200 may also be similarly employed. In such a case, the input force 904 is applied in the opposite direction of the arrow. Furthermore, the combined structural element 400 of the present invention may also be used. Similarly, structural elements 700 and 800 can also be utilized in the pump 900 of the present invention.

Structures with Reusable Fluid

In many applications, the structure of a system must initially withstand large forces, vibration, etc., but is not subject to such forces and disturbances afterwards. This is for example the case for various spacecraft and satellites since they are subjected to large acceleration and vibrational forces during the launch, but are minimally loaded during the flight. The structure of such systems, e.g., their main frame, can be constructed with the structural elements 100, 200, 400, 700, 800 of the present invention to provide the desired stiffness and damping during the launch. Once in orbit or when the input forces and disturbances are substantially reduced, the fluid stored within the structural elements 100, 200 can then be extracted and used, e.g., as fuel. The advantages of such structures include:

Relatively lighter structural weight;

High internal damping of the resulting structure, thereby reduced vibration related problems;

Increase life of the satellite in orbit through the increased supply of the fuel; and Reduced mass of the structure following extraction of the fluid, thereby easier to maneuver and reach higher orbit.

Figure 10:
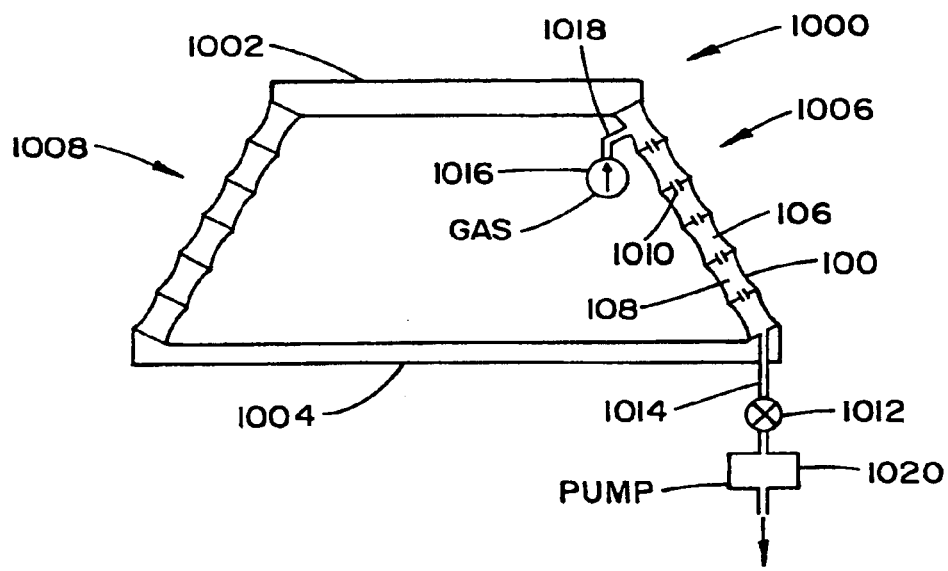
FIG. 10 illustrates a structure, at least a portion of which is constructed of the structural elements of the present invention.

A typical design of such structures is shown in FIG. 10, referred to generally by reference numeral 1000. In this design, the structure 1000 consists of top 1002 and bottom 1004 plates held together with column like structures, two of which are shown as columns 1006 and 1008. The columns 1006 and 1008 are constructed with stacked tensile elements 100 having an internal fluid 108 stored in their respective cavities 106. Although, the structure 1000 shown in FIG. 10 illustrates tensile structural elements 100, it should be apparent to those in the art that other combinations of tensile and/or compressive elements 100, 200, 400, 700, and 800 may also be used.

The cavity 106 of some or all the structural elements 100 are preferably interconnected with openings 1010. The openings 1010 may be equipped with one way valves (not shown) for preferential flow of the internal fluid, orifices (not shown) to control the rate of flow and increase internal damping, active valves (not shown) to regulate and/or open and close the opening 1010, etc. The internal fluid 108 can then be extracted by proper selection and activation of the valves and opening of an exit valve 1012 at an exit port 1014 to allow the outward flow of the fluid 108 from the cavities 106. It the absence of gravity, outside vacuum or other sources, air or some gas from tank 1016 has to be pumped or allowed to flow into the interior of the elements via an inlet 1018 to allow the outflow of the internal fluid 108. A pump 1020 may also be positioned at the exit port 1014 to pump the fluid 108 out forcefully or in a controlled manner.

Although, only column 1006 is illustrated as having interconnected cavities and an exit port 1014, it should be apparent that such was illustrated for simplification purposes only. In practice, any number of the structure's components which require an initial resistance to large forces and/or vibration can be fitted with the structural elements 100, 200 of the present invention and some or all such components can share a common exit port 1014 or each have separate exit ports.

Adaptive Structures

A structure that is constructed similar to that shown in FIG. 10 may also be made to function as an adaptive structure. In this sense, one may time vary the following parameters of the structure:

By varying the size of the openings 1010, i.e., the orifice size, at one or more locations, the internal damping of the structure 1000 (or component thereof) can be varied;

By providing more or less resistance at the exit port 1014, the stiffness of the structure (or component thereof) can be varied;

By varying the fluid pressure of one or more of the elements 100 through the exit port 1014, the stiffness of the structure 1000 (or component thereof) can be varied.

By filling one or more of the cavities 106 of the structural elements 100 with magnetorestrictive (MR) material (which becomes more viscous by the applied magnetic field) or electrorestrictive (ER) material (which becomes more viscous with applied voltage), the internal damping of the structural element 100 and thereby the structure 1000 (or component thereof) can be varied.

By filling the cavity 106 of one or more of the structural elements 100 with magnetically or electrically activated polymers, the stiffness of the structural element 100 and thereby the structure 1000 (or component thereof) can be varied.

The resulting structures 1000 can therefore be used to damp or reduce vibrational excitation, enhance the precision of the operation of the system, control the effects of structural deformation, etc., in passive or active modes.

Spring-damper Unit

Figure 11:
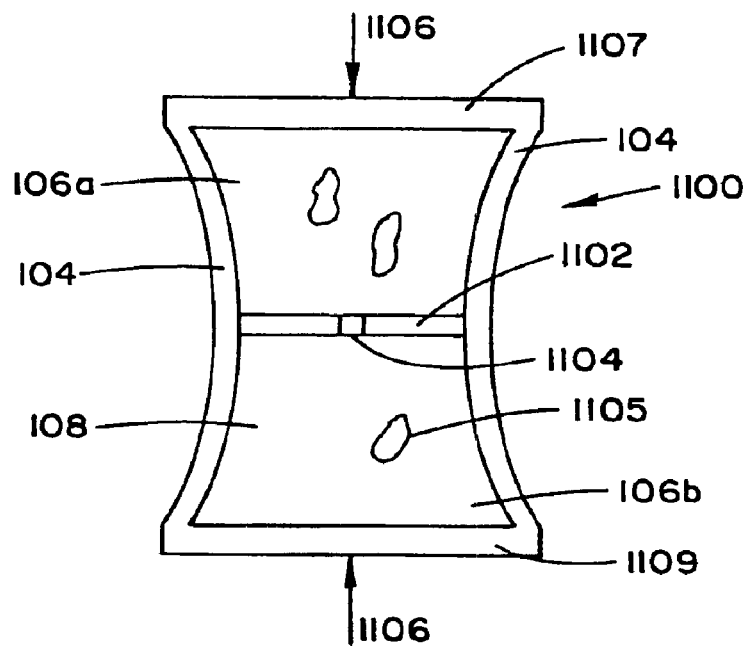
FIG. 11 illustrates a modified structural element of the present invention used as a spring.

The compressive and tensile structural elements 100, 200, 400, 700, 800 of the present invention, can also be used as springs, dampers and combination of springs and dampers. Referring now to FIG. 11, there is illustrated a modified tensile structural element 1100. The tensile structural element 1100 further has an internal wall 1102 having a orifice 1104 connecting a first part of the cavity 106a to a second part of the cavity 106b. By selecting appropriate shapes (symmetrical or non-symmetrical about the plane of the orifice 1104) and varying the thickness of wall 104 along the length of the element 1100, and by filling 1105 the element 1100 with an appropriate fluid with fillers of appropriate compressibility (i.e., volume change to fluid pressure ratio), the element can be designed with a desired longitudinal load-displacement (spring rate) characteristic. By providing an appropriately sized orifice 1104, the internal damping of the element 1100 can also be set within a certain range. The internal flow through the orifice 1104 with the application of a force or displacement 1106 at the top 1107 and/or bottom 1109 walls can also be enhanced by choosing a non-symmetrical shape for the side walls 104 and making the walls defining the first part of the cavity 106a (on one side of the orifice 1104) less or more stiff than the walls defining the second part of the cavity 106b (on the other side of the orifice 1104). It should, therefore, be apparent to those of skill in the art that the structural elements 1100 can in fact be designed to act as nearly pure springs or as spring-damper units.

In addition, by filling the structural element 1100 up with MR (ER) fluids, the damping rate thereof can be arbitrarily varied by introducing a magnetic (electric) field around the orifice area. In a similar manner, by introducing magnetic (electric) field throughout the fluid, the stiffness (longitudinal spring rate) of the element 1100 can be varied. Of course, the other structural elements of the present invention 200, 400, 700, and 800 can also be used without departing from the scope or spirit of the present invention.

Figure 12:
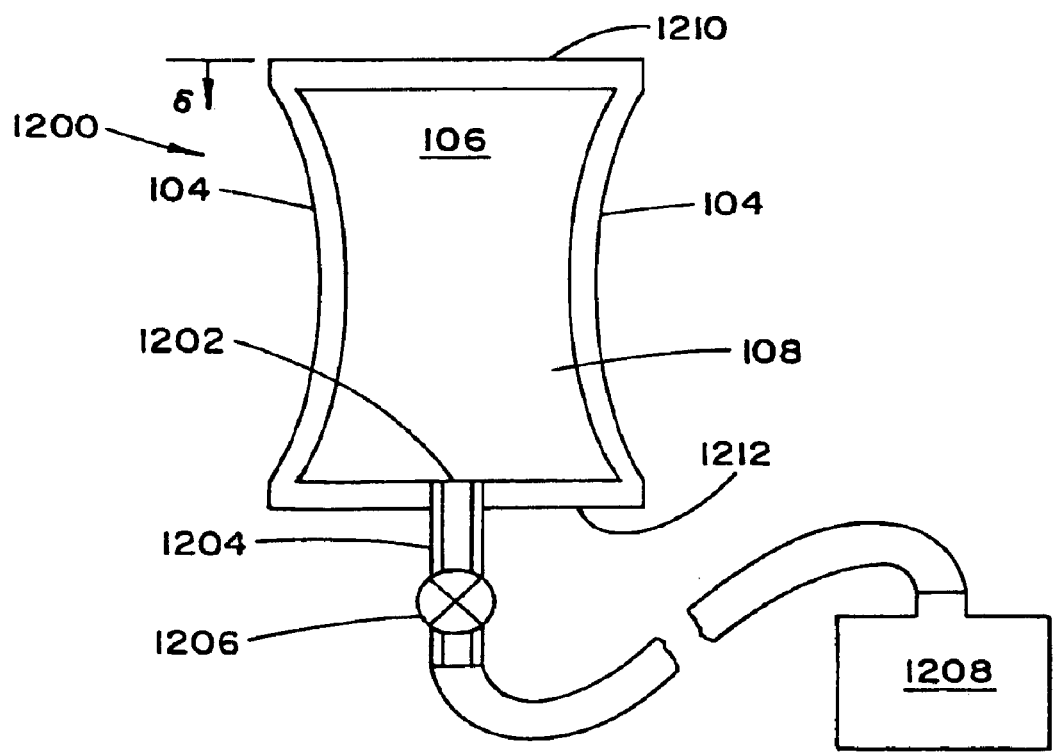
FIG. 12 illustrates another modified structural element of the present invention used to store potential energy.

In another embodiment, the element of FIG. 11, with or without the orifice 1104, can be designed with an appropriate spring rate. Referring now to FIG. 12, there is illustrated another modified tensile structural element 1200 having an outlet 1202 with a passage 1204 and a valve 1206. A pump (not shown) can then be used to pump part of the fluid out of the cavity 106 of the tensile structural element 1200 into a reservoir 1208, thereby causing the top wall 1210 to displace longitudinally an amount delta (δ) relative to the bottom wall 1212. The valve 1206 is then closed. The tensile structural element 1200 will then act as a pre-loaded spring that is locked (by the closing of the valve 1206) in place. The potential energy stored in the structural element 1200 can be readily released when desired by simply opening up the valve 1206 and allowing the fluid to flow back into the structural element 1200. The valve 1206 may preferably be controlled electrically to control the rate of spring return to its original shape and to later control the damping rate of the structural element 1200 by varying the valve passage area. Those of skill in the art will recognize that opposite steps are required to store energy in a compressive structural element, namely, fluid must be pumped into the cavity of the compressive structural elements, a valve closed to lock the element in place, and opening the valve to release the energy stored therein.

Two or more of the structural elements 1200 of FIG. 12 may be stacked to provide the desired total spring displacement and rate with the interior space of the structural elements connected together and then to the valve 1206 or individually connected to such control valves. An individual or stacked version of such units may also be used as hydraulic actuators similar to hydraulic cylinders to provide the displacement delta with the inflow and outflow of the fluid under pressure.

Pre-loading of Spring/structural Elements

In all spring and structural applications, the tensile and compressive elements 100, 200, 400, 700, 800 can be pre-loaded by pressurizing the internal fluid 108 in the cavity 106. For instance, when the internal fluid of one of the tensile structural elements 100 is pressurized, it would take certain amount of compressive force to bring it back to its original shape. Therefore when used at its original length (within a structure or system), it could resist both tensile and compressive loads. The elements are therefore made capable of carrying load in either direction.

In another application, if the structure in which such structural elements are used is deformed under external loading, by appropriately pressurizing the internal fluid of the various structural elements, the structure can be forced to tend to regain its original shape.

While there has been shown and described what is considered to be preferred embodiments of the invention, it will of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. A structure comprising at least one structural component, the at least one structural component having at least one structural element for resisting deflection of the structure, the structural element having an internal cavity for storage of a first fluid which is consumed with time, the ability of the at least one structural element to resist deflection being based upon the amount of the first fluid contained in the internal cavity;

wherein the structural component comprises a plurality of structural elements, at least two of which having an opening connecting their respective internal cavities.

2. The structure of claim 1, wherein each of the plurality of structural elements have the opening connecting it to the internal cavity of another structural element such that the plurality of internal cavities operate as a single cavity.

3. The structure of claim 1, further comprising an outlet in communication with one of the at least two structural elements having the opening for removing the first fluid from their respective internal cavities.

4. The structure of claim 3, further comprising a valve disposed in the outlet for selective extraction of the first fluid from the internal cavities.

5. The structure of claim 3, further comprising a pump disposed in the outlet for pumping the first fluid from the internal cavities.

6. The structure of claim 3, further comprising an inlet in communication with the other of the at least two structural elements having the opening for supplying a second fluid to the internal cavities to displace the first fluid.

7. The structure of claim 6, wherein the first fluid is a liquid and the second fluid is a gas.

8. The structure of claim 1, wherein at least one of the plurality of structural elements comprises:
an enclosure having a first wall and two or more second walls surrounding the internal cavity;
wherein the two or more second walls each having at least a portion thereof shaped such that a force acting on the first wall tending to deflect the element causes an amplified deflection of the two or more second walls into the cavity, thereby exerting a compressive force against the first fluid in the internal cavity, resulting in a resistance to the deflection and the force tending to deflect the element.

9. The structure of claim 8, wherein the two or more second walls are outwardly shaped away from the internal cavity and the force is a tensile force acting on the first wall tending to elongate the element by the deflection.

10. The structure of claim 8, wherein the two or more second walls are inwardly shaped towards from the internal cavity and the force is a compressive force acting on the first wall tending to compress the element by the deflection.

11. A structural element comprising:
an enclosure having a first wall and two or more second walls surrounding a cavity, the enclosure further having an internal wall separating the cavity into first and second portions, the internal wall having an orifice providing communication between fluid disposed in the first and second portions;
wherein the two or more second walls each have at least a portion thereof shaped such that a force acting on the first wall tending to deflect the element causes an amplified deflection of the two or more second walls into the cavity, thereby exerting a compressive force against the fluid, resulting in a resistance to the deflection and the force tending to deflect the element.

12. The structural element of claim 11, wherein the two or more second walls are outwardly shaped away from the cavity and the force is a tensile force acting on the first wall tending to elongate the element by the deflection.

13. The structural element of claim 11, wherein the two or more second walls are inwardly shaped towards the cavity and the force is a compressive force acting on the first wall tending to compress the element by the deflection.

14. The structural element of claim 11, wherein the portion of the first walls which surround the first portion of the cavity has a different stiffness than the portion of the first walls which surround the second portion of the cavity.

15. The structural element of claim 11, wherein the fluid is a magneto-resistive fluid and the structural element further comprises a means for applying a magnetic field to the magneto-resistive fluid.

16. The structural element of claim 11, wherein the fluid is a electro-resistive fluid and the structural element further comprises a means for applying an electric field to the electro-resistive fluid.

17. A method for storing and releasing energy in a structural element, the structural element comprising an enclosure having a first wall and two or more second walls surrounding a cavity, and a fluid disposed in the cavity, wherein the two or more second walls each having at least a portion thereof shaped such that a deflection of the first wall causes an amplified second deflection of the two or more second walls into the fluid, the method comprising the steps of;
deflecting the first wall into a deflected position;
locking the structural element in the deflected position; and
releasing the structural element from the deflected position.

18. The method of claim 17, wherein the two or more second walls are inwardly shaped towards the cavity.

19. The method of claim 18, wherein the deflecting step comprises withdrawing a portion of the fluid from the cavity.

20. The method of claim 19, wherein the locking step comprises preventing the withdrawn fluid from returning to the cavity.

21. The method of claim 20, wherein the releasing step comprises returning the withdrawn fluid to the cavity.

22. The method of claim 17, wherein the two or more second walls are outwardly shaped away from the cavity.

23. The method of claim 18, wherein the deflecting step comprises adding fluid to the cavity.

24. The method of claim 23, wherein the locking step comprises preventing the added fluid from leaving the cavity.

25. The method of claim 24, wherein the releasing step comprises withdrawing the added fluid from the cavity.

26. A structural element comprising:
an enclosure having a first wall and two or more second walls surrounding a cavity; and
a fluid disposed in the cavity,
wherein the two or more second walls each having at least a portion thereof shaped such that a force acting on the first wall tending to deflect the element causes an amplified second deflection of the two or more second walls into the fluid, thereby exerting a second compressive force against the fluid, resulting in a resistance to the first deflection and the first compressive force tending to compress the element;
the structural element further comprising pressuring means for varying the pressure of the fluid in the cavity to thereby vary the resistance to the deflection.

27. The structural element of claim 26, wherein the two or more second walls are outwardly shaped away from the cavity and the force is a tensile force acting on the first wall tending to elongate the element by the deflection.

28. The structural element of claim 26, wherein the two or more second walls are inwardly shaped towards the cavity and the force is a compressive force acting on the first wall tending to compress the element by the deflection.

29. The structural element of claim 26, wherein the pressure of fluid in the cavity is increased to thereby increase the resistance to the deflection.

30. The structural element of claim 26, wherein the pressure of fluid in the cavity is decreased to thereby decrease the resistance to the deflection.

* * * * *